(12) United States Patent
Kröger et al.

(10) Patent No.: US 6,315,372 B1
(45) Date of Patent: Nov. 13, 2001

(54) BRAKE PRESSURE CONTROL DEVICE FOR A BRAKE SYSTEM OF A ROAD VEHICLE

(75) Inventors: Torsten Kröger, Stuttgart; Jochen Reiter, Wernau, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/422,064

(22) Filed: Oct. 21, 1999

(30) Foreign Application Priority Data

Oct. 21, 1998 (DE) ............................................. 198 48 448

(51) Int. Cl.[7] ...................................................... B60T 8/32
(52) U.S. Cl. ................................................................ 303/191
(58) Field of Search ................................. 303/191, 192; 188/DIG. 2

(56) References Cited

U.S. PATENT DOCUMENTS

| | | | | |
|---|---|---|---|---|
| 4,666,021 | * | 5/1987 | Messersmith | 188/331 |
| 4,768,610 | * | 9/1988 | Pagel et al. | 180/271 |
| 5,052,531 | * | 10/1991 | Bota | 192/4 A |
| 5,101,945 | * | 4/1992 | Scott | 192/13 R |
| 5,415,467 | * | 5/1995 | Utz et al. | 303/89 |
| 5,700,227 | * | 12/1997 | Kosik et al. | 477/171 |
| 5,911,646 | * | 6/1999 | Tsutsui et al. | 477/93 |
| 5,916,062 | * | 6/1999 | Siepker | 477/194 |
| 5,967,628 | * | 10/1999 | Abe et al. | 303/122.12 |
| 5,984,429 | * | 11/1999 | Nell et al. | 303/113.4 |
| 6,033,340 | * | 3/2000 | Amendt et al. | 477/77 |
| 6,056,373 | * | 5/2000 | Zechmann et al. | 303/191 |

FOREIGN PATENT DOCUMENTS 36 21 076  1/1988 (DE).
19611360 C2  9/1997 (DE).

* cited by examiner

*Primary Examiner*—Robert J. Oberleitner
*Assistant Examiner*—Devon Kramer
(74) *Attorney, Agent, or Firm*—Crowell & Moring, L.L.P.

(57) ABSTRACT

A brake pressure control device of a road vehicle has an automatic control of a starting clutch and/or of a transmission. During a stoppage of the motor vehicle achieved by a stoppage braking, the driver can, by a respective arbitrary activity, trigger a "starting assist" function for a defined time period. During this function, a continuation of the stoppage braking takes place by maintaining a brake pressure controlled into the wheel brakes by pressure maintaining valves so that, during the above-mentioned time period, the driver can change over to the accelerator pedal.

3 Claims, 3 Drawing Sheets

BRAKE PRESSURE CONTROL DEVICE FOR A BRAKE SYSTEM OF A ROAD VEHICLE

BACKGROUND OF THE INVENTION

This application claims the priority of 198 48 448.8, filed Oct. 21, 1998, the disclosure of which is expressly incorporated by reference herein.

The present invention relates to a brake pressure control device of a brake system of a road vehicle with an automatic control of a main clutch and/or of a transmission for the purpose of maintaining a driving condition for the duration of traffic-caused stoppage phases by controlling brake pressure into at least one wheel brake of the road vehicle.

DE 196 11 360 C2 discloses, a device for the automatic operation of a hydraulic brake system of a road vehicle to maintain a vehicle stoppage for the duration of traffic-caused stoppage phases by coupling brake pressure from a brake pressure source, which can be activated without the driver's cooperation, into at least one wheel brake of the vehicle. This device operates with a brake pressure control device which, from a processing of sensor output signals of a sensor arrangement taking place according to plausibility criteria while the engine is running and after stoppage of the vehicle achieved after a braking operation, provides an automatic continuation of the stoppage braking. After a delay period of a defined duration has elapsed from the stoppage of the vehicle, a brake pressure, which is sufficient for a secure stoppage of the vehicle, is coupled into the wheel brake(s) utilized for the stoppage braking. When the driving operation is resumed, which can be detected from a redundant combination of sensor output signals, such as the output signal of an accelerator pedal position generator and a throttle valve position sensor or of a rotational engine speed sensor, the wheel brake(s) previously utilized for the stoppage braking is (are) released.

This known brake pressure control device endeavors to carry out maneuvering operations in a simple and secure manner irrespective of a triggering of stoppage brake operation phases which meet the demand. For this purpose, the automatic stoppage braking operation will be activated only when, within the delay period, the driver starts an operating activity which can be recognized as the driver's wish to activate the automatic stoppage braking and can be detected by the sensor arrangement. The termination of the automatic stoppage braking operation occurs only if, in addition to the sensor output signals of the sensor arrangement which demonstrate the driver's wish to resume the driving operation, sensor output signals are also present which, again on the basis of plausibility criteria, indicate the meeting of safety-relevant secondary conditions.

Thus, in the known control device, the time period is triggered by reaching the stoppage of the vehicle during a stoppage braking. The brake pedal is completely released after the triggering of the stoppage braking, and the continuation of the stoppage braking, when the accelerator pedal is operated for resuming the driving operation, is terminated only if the engine hood and the vehicle doors are closed and the driver's seat is occupied.

The goal of the known brake pressure control device of representing the function of a mechanical hill holder (free wheeling)—specifically automatic prevention of rolling on a hill against the intended driving direction—by way of a brake intervention, cannot be achieved in every operating condition or can be achieved only with high technical expenditures. In practice, problems with the operating comfort may also occur depending on the construction. For example, depending on the surrounding conditions, the vehicle will roll backwards in an undesirable manner because the existing brake pressure is not sufficient. Moreover, because the brake is operated in an undesirable manner in certain operating conditions (so that, for example, the maneuvering on the hill is more difficult) or, during active braking, noise problems occur while standing as the result of the pump of the brake system.

SUMMARY OF THE INVENTION

An object of the present invention is to implement the function of the hill holder in a brake pressure control device while avoiding the now recognized disadvantages.

The foregoing object has been advantageously achieved according to the invention by providing that the time period is triggered by the operating activity ($\alpha_B > \alpha_1$) recognized as the driver's wish and the change, which can be achieved by the driver during the time period, replaces the condition for maintaining the brake pressure independent of the intervention by the driver by the condition for the adjustment of a brake pressure dependent on the intervention by the driver, and in that, at the end of the time period, the control device is necessarily brought into its condition for the adjustment of a brake pressure dependent on the intervention by the driver.

In the brake pressure control device according to the invention, the time period for the change of the condition of the control device which can be achieved by the driver is triggered by an arbitrary activity of the driver, for example, by the intentional "bridging" of the brake pedal during the stoppage of the vehicle. In this case, the alteration changes the control device from the condition for adjusting a brake pressure dependent on the intervention by the driver into the condition representing the actual "hill holder" function for maintaining a brake pressure independent of the intervention by the driver.

The elimination of this "hill holder" function, i.e., the change back into the condition of the control device for the adjustment of a brake pressure dependent on the intervention by the driver takes place automatically synchronized with the starting operation initiated by the driver by releasing the brake pedal and operating the accelerator pedal, with the automatic control of the main clutch and/or of a transmission. Should the driver not initiate this starting operation within the time period after, for example, bridging of the brake pedal, the "hill holder" function will automatically switch off. That is, the control device changes into the condition for adjusting a brake pressure dependent on the intervention by the driver, whereupon the brake pressure occurs which corresponds to the actual position of the brake pedal.

In the brake pressure control device according to the invention, the time period is usefully defined to be so short that the driver can change from the brake pedal to the accelerator pedal, without starting the movement of the vehicle. Although the brake pressure required for the stoppage of the vehicle must then be continuously modulated by the driver during the stoppage, short excitation periods are obtained thereby for the electromagnetic pressure control valves or pressure maintaining valves normally required for maintaining a brake pressure independent of the intervention by the driver. The pressure control and pressure maintaining valves heat up to an unacceptable degree during longer periods of excitation. For the usefulness of the operation of the brake pressure control device according to the invention, the active condition of the "hill holder" function is advantageously indicated in a known manner.

In the brake pressure control device according to the invention, when starting on a hill, the automatic "hill holder" function of the brake system is followed by an automatic start control function triggered by the accelerator pedal. In this case, the "hill holder" function is advantageously switched off under these circumstances only when the transmission capacity of the main clutch or of the transmission line between the engine and the vehicle wheel is recognized as being sufficient.

The logic devices of the brake pressure control device according to the invention can be integrated without additional sensors or actuators of the known brake pressure control devices, such as a wheel slip control system or an ESP in conjunction with automatically controlled clutches or transmissions in a simple manner, so that no separate logic unit is required.

The brake pressure control device according to the invention can be used in vehicles which are equipped with a shift transmission and an automated clutch, with an automated shift transmission, with a conventional shift transmission or with an automatic transmission of any mechanical principle without a hill support.

DETAILED DESCRIPTION OF THE DRAWINGS

Figure 1:
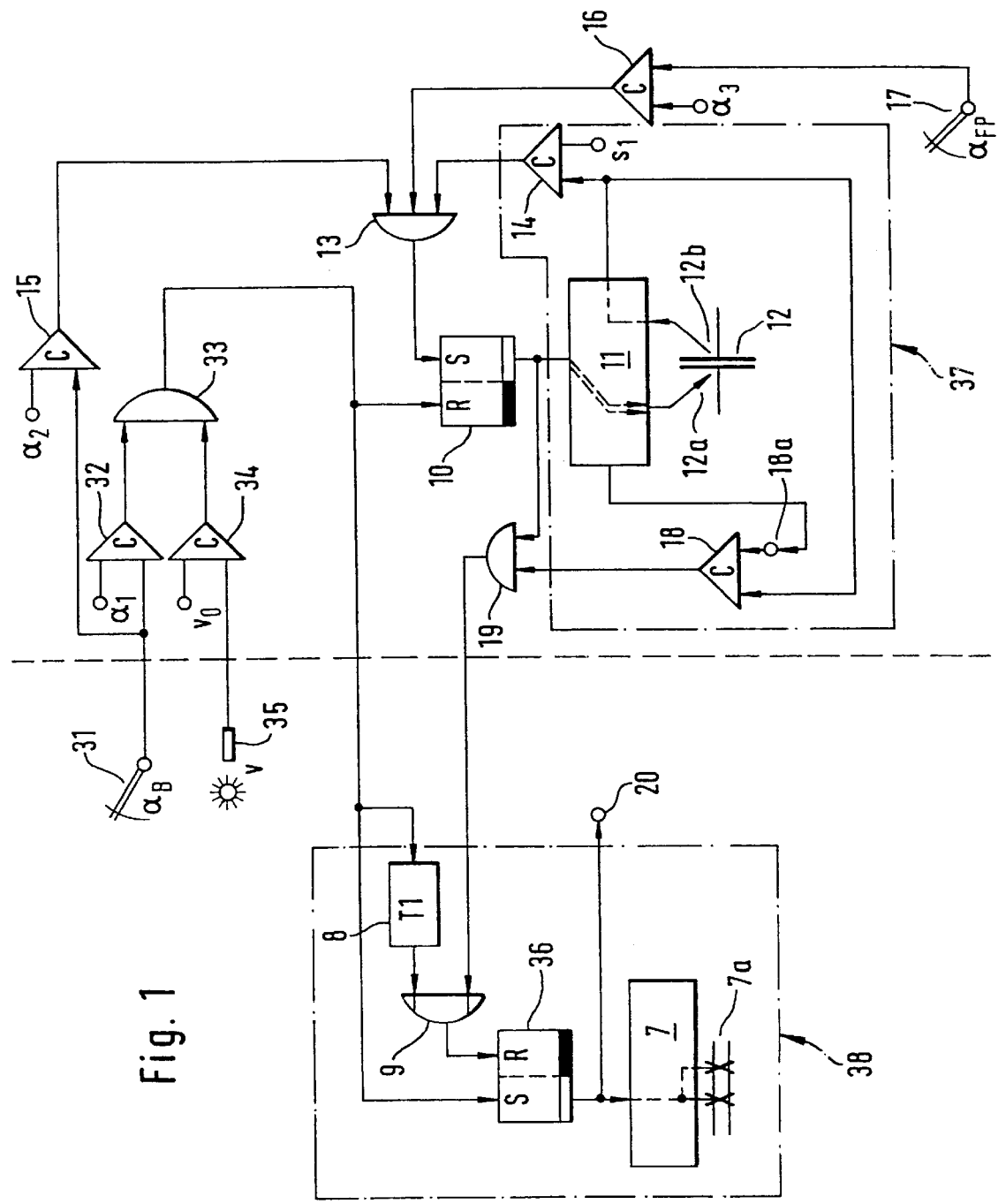
FIG. 1 is a schematic diagram of a first embodiment of the brake pressure control device according to the present invention.

With reference to FIG. 1, the arrangement for controlling a motor vehicle having a driving engine and an automated shift transmission situated in the power flux between the driving engine and the driven vehicle wheels, and having a brake system associated in a known manner with all vehicle wheels is divided into a portion pertaining to the transmission 37 and into a portion pertaining to the brake system 38. A brake pedal angle $\alpha_B$ (alternatively, a membrane path or brake pressure) input signal is supplied to the transmission side part by a sensor 31. This signal is checked in a comparator 32 with respect to exceeding a high threshold value $\alpha_1$ ("brake pedal bridged").

The output of the comparator 32 is connected with one input of an AND gate 33, at whose other input a comparator 34 is situated in which the input signal vehicle velocity v of a sensor 35 is checked with respect to falling below a minimal threshold value $v_0$ ("vehicle is standing"). When both conditions are met at the AND gate 33, a holding wish is recognized and, by setting a switching step "holding wish" 36, is stored as a logic condition 36-s. This logic condition 36-s causes an electronic brake pressure control device 7 to activate pressure maintaining valves 7a whose function is known and which are a component of the hydraulic brake system 38. The holding wish signal is also supplied to a time function element 8 which, after the expiration of a delay period T1, by way of an OR gate 9 triggers a reset input R of the switching step 36 and thus deactivates the hill holder function of the control device 7 according to the invention previously effective in the logic condition 36-s as a so-called "starting assist" (logic condition 36-r).

The other input of the OR gate 9 is triggered on the transmission side, as described below. The holding wish signal from the AND gate 33 also controls a rest input R of a switching step "starting wish" 10. In this condition, an electronic transmission control 11 provides that a starting clutch 12 is opened up which connects the driving engine with the transmission (the pertaining logic is part of the transmission control and is therefore need not be shown here in detail). The clutch 12 has an actuator 12a and a sensor 12b and, together with the transmission control 11, forms a control circuit for adjusting the clutch travel.

A starting wish signal is generated by an AND gate 13, whose three inputs are connected with a comparator 14 by way of which the clutch travel 12b is checked with respect to falling below a low threshold value $s_1$ ("clutch open"), with a comparator 15 by way of which the brake pedal angle $\alpha_B$ is checked with respect to falling below a low threshold value $\alpha_2$ ("brake pedal not operated"), as well as with a comparator 16 by way of which the accelerator pedal angle $\alpha_{FP}$ detected by a sensor 27 is checked with respect to exceeding a low threshold value $\alpha_3$ ("accelerator pedal operated"). When all three conditions are met at the AND gate 13, the starting wish is recognized and, by setting the switching step "starting wish" 10, is stored as a logic condition 10-s. This condition causes the transmission control 11 to trigger the clutch 12 according to the sequence defined there for the starting operation.

As soon as the clutch travel 12b has exceeded a threshold value 18a at a comparator 18 ("clutch 12 able to transmit"), if the switching step 10 is set simultaneously, a deactivation command for the "starting assist" function (logic condition 36-s) is generated at an AND gate 16 and is transmitted by the OR gate 9 to the switching step 36. It is particularly advantageous here if the threshold value 18a for recognizing the transmission capacity of the clutch 12 is not a fixed value but, on the contrary, is adapted by the transmission control 11 as a function of additional parameters existing there, such as the engine load or the clutch wear, to the actual conditions of the surroundings. If desired, an acknowledgment signal 20 to the driver concerning the activation condition of the "starting assist" function can be tapped at the output of the switching step 36.

Figure 2:
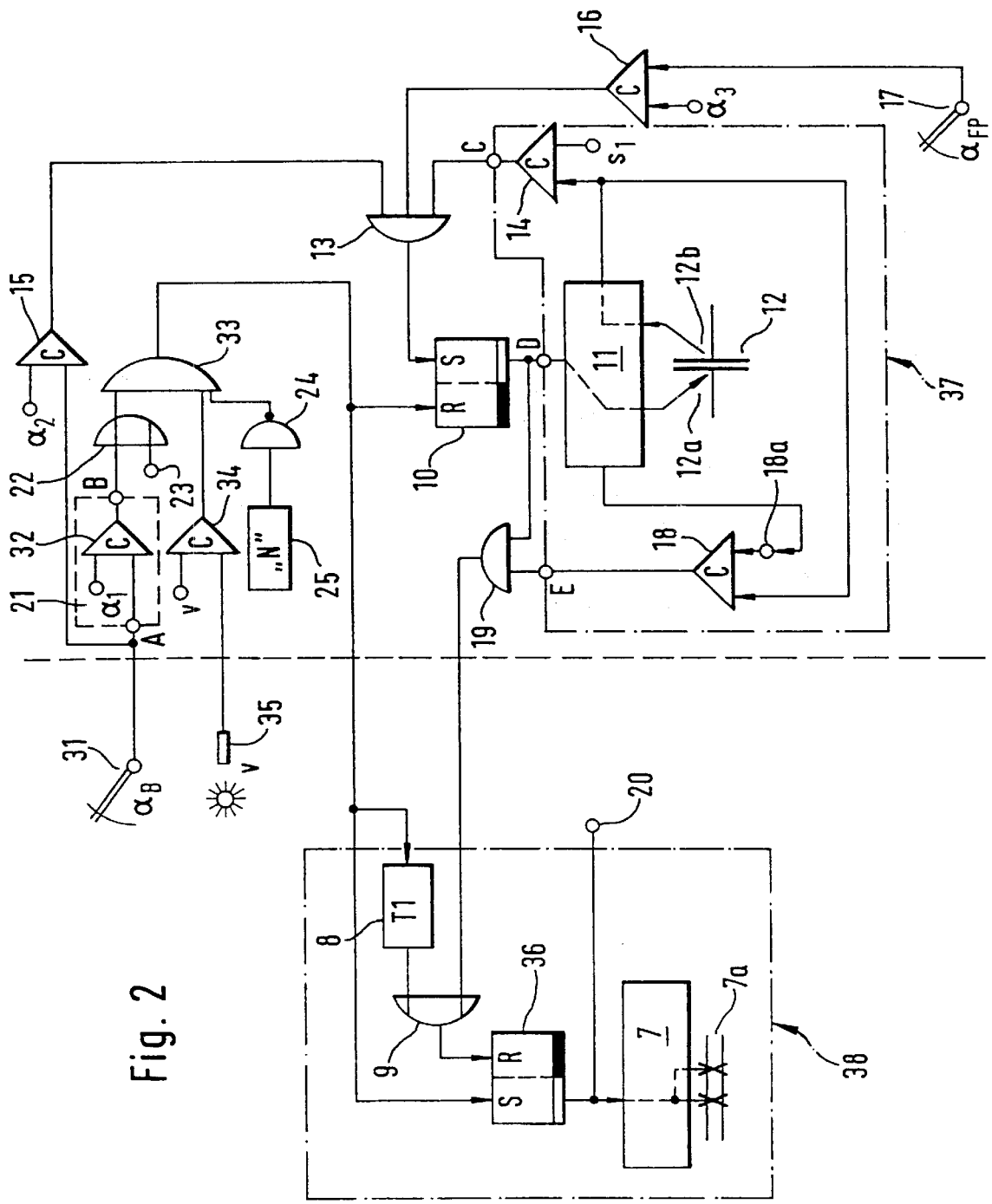
FIG. 2 is a schematic diagram of a second embodiment of the brake pressure control device according to the invention.

The embodiment of the brake pressure control device of FIG. 2 has the following circuit-related and/or functional expansions. For block 21 "triggering by the driver", an input A and an output B are provided with respect to the circuit. For block 37 "transmission", an input D and outputs C and E are provided with respect to the circuit.

The output B of block 21 "triggering by the driver" is optionally connected by way of an OR step 22, at whose other input a signal 23 is present, with the AND step 33. The signal 23 is a starting wish signal which is detected arbitrarily automatically (i.e., without an intentional intervention by the driver) corresponding to the state of the art. This signal—expediently adjusted to a low sensitivity—can be combined with the driver trigger signal ("semi-automatic system") in order to increase the degree of automation and thus the comfort while simultaneously avoiding a faulty triggering of the automatic system.

For the AND step 33, another input is provided to which, by way of a NOT step 24, a signal 25 for the "neutral transmission and selector lever position" is supplied which is detected by a sensor system and which is tapped at a suitable point on the transmission side. This prevents the triggering of the "starting assist" function (logic condition 36-s) as long as no gear is engaged. Otherwise the construction and method of operation of the two embodiments of FIGS. 1 and 2 correspond to one another, so that reference can be made to the above description of FIG. 1 for the operation of both embodiments.

Figure 3:
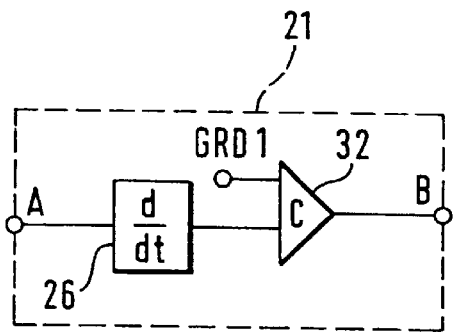
FIG. 3 is a partial schematic diagram of a third embodiment of the brake pressure control device according to the invention.

The third embodiment of FIG. 3 differs from that of FIG. 2 only because of the fact that the adjusting speed (gradient) of the brake pedal 31 is generated from the input signal A of block 21 "triggering by the driver" by a differentiating step 26. This gradient is checked in the comparator 32 with respect to a falling below a negative limit value "GRD 1", whose logic output signal indicates a "fast brake pedal release" and is supplied to the output B.

A conclusion is drawn on the basis of the above with respect to a starting operation intended by the driver (fast change-over from the brake to the accelerator pedal). In the third embodiment, a sufficiently sensitive adjustment of the limit value is to be provided in order to reliably trigger the "starting assist" function (logic condition 36-s) even before, by releasing the brake pedal 31, the brake pressure is completely reduced in the wheel brakes connected to the pressure maintaining valves 7a. Otherwise, the embodiment of FIG. 3 can operate and be constructed in the same manner as the embodiments of FIGS. 1 and 2.

Figure 4:
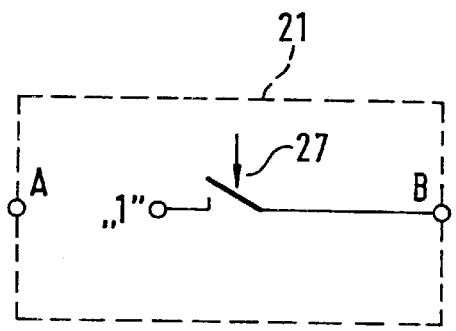
FIG. 4 is a partial schematic diagram of a fourth embodiment of the brake pressure control device according to the invention.

The fourth embodiment of FIG. 4 differs from the first through third embodiments of FIGS. 1 to 3 in that the "triggering by the driver" block 21 consists only of a key button 27 to be operated by the driver by way of which a logic "1" is placed at the output B (manual triggering pulse). The input A is free. That is, in this fourth embodiment, there is no connection to the brake pedal 31 with respect to the triggering of the "starting assist" function (logic condition 36-s). In this embodiment, the activation of the "starting assist" function is also dependent on a simultaneous operation of the brake pedal 31 to the extent that, when the "starting assist" function is activated, the brake system 38 builds up no brake pressure but only maintains the previously built-up brake pressure. Otherwise, the embodiment of FIG. 4 can operate and be constructed in the same manner as the embodiment of FIG. 1.

Figure 5:
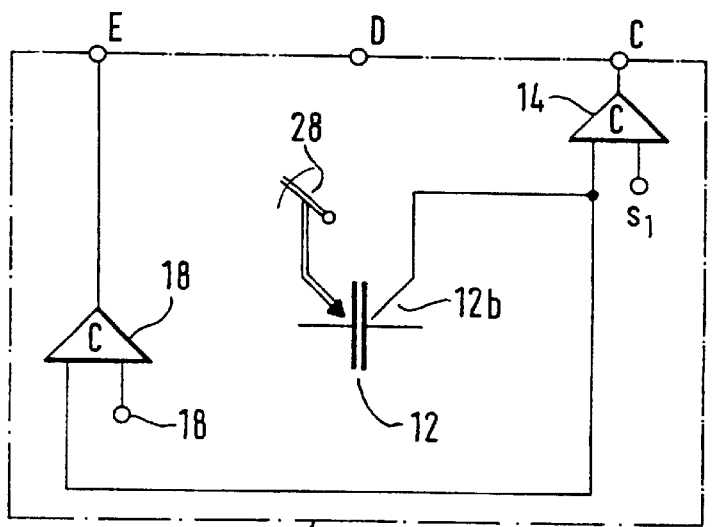
FIG. 5 is a partial schematic diagram of a fifth embodiment of the brake pressure control device according to the invention.

In the fifth embodiment of FIG. 5, a manually shifted multi-step reduction gear is provided for the transmission 37 and has a starting clutch 12 which can be operated by a conventional clutch pedal 28. Analogously to the embodiment of FIGS. 1 and 2, the output signal C means "clutch 12 is open", and the output signal E means "clutch 12 is capable of transmitting". In this embodiment, the input signal D "starting wish driver recognized" is not used because there is no electronic clutch control. The clutch 12 is, however, equipped with a clutch travel sensor 12b in order to permit the generation of the output signals C and E via the electronic components 14, s1, 18 analogous to the embodiment of FIGS. 1 and 2, so that a respective method of operation can be achieved.

An automatic transmission with a torque converter is always frictionally connected in position "D". Therefore, it is generally not necessary for automatic transmissions to be coupled with the transmission control when a hill holder function (starting assist) according to the invention is used, apart from the processing of the neutral position during the generation of the triggering signal (positions 22, 23 in the second embodiment of FIG. 2). An immediate deactivation of the "starting assist" function would at most be conceivable during the operation of the selector lever, which, however, represents a functional expansion which is not absolutely necessary.

Another contemplated use may be considered for an automatic transmission with an automatic load clearing (in the driving position while standing). Optionally, a synchronization could be introduced here of the elimination of the load clearing and of the deactivation of the "starting assist" function by way of the electronic components 18, 18a analogous to the embodiment of FIG. 2.

The described embodiments are based on a brake system 38 having pressure maintaining valves 7a which are not necessarily resistant to fatigue. In the "starting assist" function, the present invention can also be combined with fatigue-resistant pressure maintaining valves 7a (time constant T1 in the time function element 8 may have an arbitrarily high date) or a brake pressure unit which actively builds up brake pressure.

In the pressure maintaining valves 7a which are not resistant to fatigue, all four wheels (current state of the art in the case of the ESP) can be operated on always only one pair simultaneously (for example, only in the front or only in the rear), but to address the two pairs alternately or by another suitable switch-over logic in order to thus double the possible total switch-on time of the valves.

In these listed usage possibilities, the invention can in principle be maintained unchanged in the "starting assist" function.

The advantageous acknowledgment 20 of the active condition of the "starting assist" function to the driver can be transmitted, not only by a display light in the center console but, alternatively or in addition, to the engine timing system. As a particularly advantageous consequence, by way of an increase of the desired rotational speed (or the throttle valve position or of the torque), not only an acknowledgment is generated by way of the engine which can be felt by the driver, but the subsequent starting operation is simultaneously assisted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pressure control device of a brake system of a road vehicle with an automatic control of at least one of a main clutch and a transmission maintaining a driving condition during traffic-caused stoppage phases by controlling brake pressure into at least one wheel brake of the road vehicle, comprising apparatus configured to process sensor output signals of a sensor arrangement according to predetermined actuation criteria after a stoppage of the road vehicle achieved by controlling a brake pressure into the wheel brake utilized for stoppage braking to achieve a secure stoppage of the road vehicle and to permit an arbitrary continuation of the stoppage braking by maintaining the brake pressure held independently of an intervention by the driver such that, when a driving operation is resumed detection of by at least an output signal of an accelerator pedal position generator, automatic release of the wheel brake previously utilized for the stoppage braking is provided by switching off the brake pressure, wherein the arbitrary continuation of the stoppage braking activated only if a driver starts an activating activity that is recognized as a respective driver's wish and is detected by the sensor arrangement, and, after a stoppage of the road vehicle achieved by the stoppage braking, a time period of predetermined duration is automatically triggered during which a change between two conditions of the control device is achieved by driver intervention, whereby in the one condition of the control device, only a brake pressure dependent on the intervention by the driver is adjustable, and in the other condition of the control device necessarily maintains a braking pressure which is independent of the driver intervention, the time period being triggered by an operating activity recognized as the driver's wish and the change, which is achievable by the driver during the time period, replaces the condition for maintaining the brake pressure independent of the intervention by the driver by the condition for adjustment of a brake pressure dependent on the intervention by the driver, and, at the end of the time period, the control device is brought into a condition thereof for the adjustment of a brake pressure dependent on the driver intervention.

2. The control device according to claim 1, where the change is achievable by the driver during the time period into the condition for the adjustment of a brake pressure dependent on the driver intervention is permitted only when the sensor arrangement recognizes a value of a torque transmission capacity of a transmission line connecting a driving engine with the vehicle wheel pertaining to the wheel brake utilized for the stoppage braking.

3. A brake pressure control method for a brake system of a road vehicle with an automatic control of at least one of a main clutch and a transmission for maintaining a driving condition during traffic-caused stoppage phases by controlling brake pressure into at least one wheel brake of the road vehicle, comprising (a) processing sensor output signals of a sensor arrangement according to predetermined actualization criteria after a stoppage of the road vehicle achieved by controlling a brake pressure into the wheel brake utilized for stoppage braking to achieve a sensor stoppage of the road vehicle, (b) permitting an arbitrary continuation of the stoppage braking by maintaining the brake pressure held independently of an intervention by a driver, (c) when a driving operation is resumed by detection of at least one sensor output signal, providing automatic release of the wheel brake previously utilized for the stoppage braking by switching off the brake pressure, (d) activating the arbitrary continuation of the stoppage braking only if the driver starts an activating activity recognizable as a respective driver's wish that is detectable by the sensor arrangement, (e) after a stoppage of the road vehicle achieved by the stoppage braking, automatically triggering a time period of predetermined duration, (f) during the predetermined duration time period, achieving a change between two conditions of the control device by driver intervention, which in one of the two conditions of the control device, only a brake pressure dependent on the intervention by the driver is adjustable, and, in the other of the two conditions, maintaining a braking pressure which is independent of the intervention by the driver, wherein the time period is triggered by a operating activity recognized as the driver's wish and the change, which is achievable by the driver during the time period, replaces the condition for maintaining the brake pressure independent of the intervention by the driver by the condition for adjustment of a brake pressure dependent on the intervention by the driver, and, at the end of the time period, the control device is brought into a condition thereof for the adjustment of a brake pressure dependent on the driver intervention.

* * * * *